(No Model.)
W. R. GEORGE.
PUMP.
No. 531,111. Patented Dec. 18, 1894.
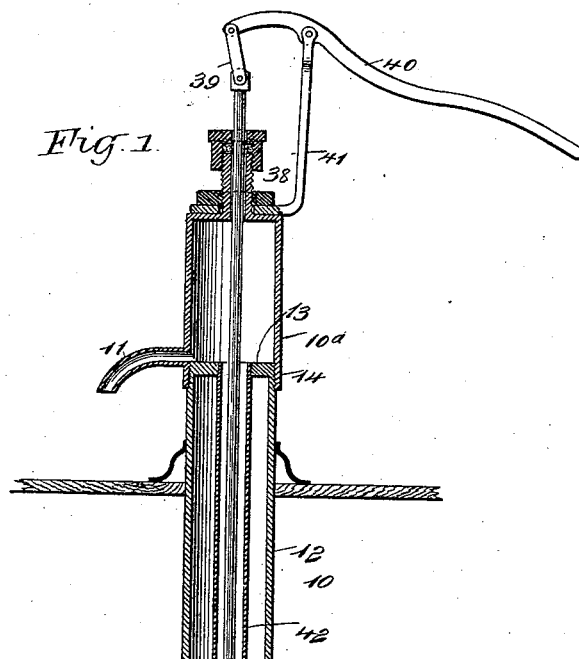
Fig. 1.
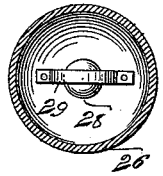
Fig. 3.
Fig. 2.
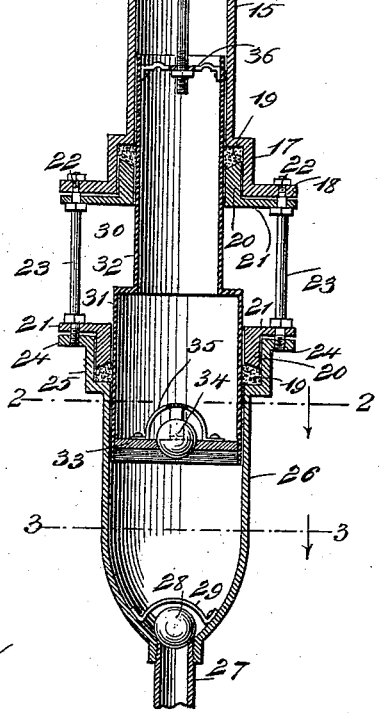
WITNESSES:
Paul Johot
H. B. Hutchinson
INVENTOR
W. R. George
BY
Munn & Co.
ATTORNEYS.

UNITED STATES PATENT OFFICE.

WILLIAM R. GEORGE, OF STAUNTON, ILLINOIS.

PUMP.

SPECIFICATION forming part of Letters Patent No. 531,111, dated December 18, 1894.

Application filed June 23, 1894. Serial No. 515,489. (No model.)

*To all whom it may concern:*

Be it known that I, WILLIAM R. GEORGE, of Staunton, in the county of Macoupin and State of Illinois, have invented a new and Improved Pump, of which the following is a full, clear, and exact description.

My invention relates to improvements in pumps and particularly to force pumps; and the object of my invention is to produce a comparatively simple pump which is adapted to be very easily operated, which is arranged in such a way that it forces water at great pressure, which has nothing about it likely to get out of repair, and which is constructed and arranged so as to throw a continuous and steady stream.

To these ends my invention consists of certain features of construction and combinations of the same, as will be hereinafter described and claimed.

Reference is to be had to the accompanying drawings, forming a part of this specification, in which similar figures of reference indicate corresponding parts in all the views.

Figure 1 is a central longitudinal section of my improved pump. Fig. 2 is a sectional plan on the line 2—2 of Fig. 1; and Fig. 3 is a sectional plan on the line 3—3 of Fig. 1.

The pump is provided with an elongated barrel 10, which is preferably made up in sections, for convenience in erecting, and which is preferably cylindrical. The top section 10$^a$ of the pump barrel has the discharge spout 11 near its lower end, whereby an air chamber is formed above the spout so as to make an air cushion against which the water may strike to assist in forcing it out through the spout 11, as hereinafter described.

The section 12, next below the section 10$^a$ is closed at the top, as shown at 13, except for a discharge pipe to be hereinafter described; and the sections 10$^a$ and 12 are screwed together, as shown at 14. The lower end of the section 12 screws, as shown at 16, to another section 15 of the pump barrel which terminates, at its lower end, in a stuffing box 17 having an exterior flange 18 to facilitate its attachment to the lower extension of the pump valve, and this stuffing box 17 contains a suitable packing 19 to fit tightly against the plunger hereinafter described, and the packing is held in place by the flange 20 of the plate 21 which is fastened to the flange 18 by bolts 22 or equivalent fastenings. The flange 18 connects, by depending rods 23, with the flange 24 of a stuffing box 25 which is like the box 17 and is formed on the upper end of the lower extension 26 of the pump barrel, this extension being of greater area than the top portion of the barrel and tapering at its lower end where it connects with the supply pipe 27. I have shown and described a certain form of stuffing box, but it will be understood that any suitable stuffing box may be used.

The lower extension 26 of the pump barrel has, at its inlet end and at the top of the pipe 27, a common ball valve 28 which is held in place by a guard 29 arranged to permit the ball to rise sufficiently to allow the water to flow into the extension 26 of the pump barrel.

The pump is provided with a tubular plunger 30, the lower end 31 of which fits snugly in the extension 26 of the barrel, while the upper end 32 fits in the upper portion of the pump barrel, as shown clearly in Fig. 1. The plunger is closed at its lower end, as shown at 33, this end having a water aperture therein, which is held normally closed by a ball valve 34, this being held beneath an ordinary guard 35. The top of the plunger has a suitable cross brace 36, to which the plunger rod 37 is attached, and this rod extends upward through a suitable stuffing box 38 at the top of the pump, where it connects, by means of a link 39, with one end of a tilting handle 40 which is fulcrumed on a bracket 41 which is secured to the top of the pump valve, and by working the handle up and down the plunger rod and plunger are reciprocated. It will be understood, however, that any suitable means may be used for reciprocating the plunger rod and plunger without affecting the principle of the pump.

The plunger rod extends through a discharge pipe 42 which opens through the top of the section 12 of the pump and extends downward into the barrel, as shown in Fig. 1, and thus the space around the pipe 42 is available as an air chamber, so that the air in this part of the pump barrel acts as a cushion to assist in ejecting the water, and this cushion, in connection with that in the upper part of the section 10ª causes the water to be ejected steadily and with great force.

The operation of the pump is as follows:—Suppose the plunger to be in the lower portion of the extension end 26 of the pump barrel. Then, as the plunger is raised a portion of the water above it is forced out through the discharge pipe 42 and spout 11, and when the plunger is moved downward the valve 34 opens while the valve 28 closes, and as the extension end 26 is of twice the area of the upper part of the pump plunger, the volume of water forced through the valve 34 and up through the plunger and pump barrel is sufficient to cause the water already in the pump barrel to be ejected and thus a constant flow is kept up while the plunger is reciprocated, and the double air cushion already described causes the water to be ejected with great force. If a hose with a taper nozzle is attached to the spout 11, the upper air chamber is brought into immediate use and causes the water to be ejected in a steady stream and with great force.

I am aware that a two diameter hollow plunger working in stuffing boxes in two separated sections of pump barrel of different diameters having outside connecting brackets or links is not new; and that the upper end of a pump casing has been provided with air chambers, and I make no broad claim to these features.

Having thus described my invention, I claim as new and desire to secure by Letters Patent—

A pump consisting of the combination of the following parts, viz: an outer casing made in four parts—an upper part having a sealed air chamber with spout and handle, a next lower section having a closed upper end with a central tube passing through it forming a passage way for water and also for the plunger rod, and also forming around the same an annular air chamber, and two separated pump barrel sections below it of different diameters with stuffing boxes connected by external tie rods; a tubular plunger of two corresponding diameters working in the said pump barrel sections; a plunger rod extending from the plunger to the handle above and passing through the central water passage way and surrounding annular air cushion; and upwardly opening valves arranged in the lower end of the pump barrel and the plunger, substantially as and for the purpose described.

WILLIAM R. GEORGE.

Witnesses:
W. C. SHIRLEY,
P. H. FISCHER.